(12) United States Patent
Walker (10) Patent No.: US 9,706,876 B2
(45) Date of Patent: Jul. 18, 2017

(54) FOOD PRODUCT CONTAINMENT ASSEMBLIES FOR USE WITH A TOASTER

(75) Inventor: Robert Larry Walker, Combine, TX (US)

(73) Assignee: Toaster Buddies Inc., Lancaster, TX (US)

( * ) Notice: Subject to any disclaimer, the term of this patent is extended or adjusted under 35 U.S.C. 154(b) by 151 days.

(21) Appl. No.: 14/234,350

(22) PCT Filed: Jul. 23, 2012

(86) PCT No.: PCT/US2012/047876
§ 371 (c)(1),
(2), (4) Date: Jan. 22, 2014

(87) PCT Pub. No.: WO2013/016294
PCT Pub. Date: Jan. 31, 2013

(65) Prior Publication Data
US 2014/0178552 A1  Jun. 26, 2014

Related U.S. Application Data (60) Provisional application No. 61/650,664, filed on May 23, 2012, provisional application No. 61/510,922, filed on Jul. 22, 2011.

(51) Int. Cl.
*A47J 37/08* (2006.01)

(52) U.S. Cl.
CPC ....... *A47J 37/0871* (2013.01); *A47J 37/0885* (2013.01)

(58) Field of Classification Search
CPC .......................... A47J 37/0871; A47J 37/0885
USPC ......... 99/391, 410–418, 426, 450, 403, 448, 99/407
See application file for complete search history.

(56) References Cited

U.S. PATENT DOCUMENTS

| | | | |
|---|---|---|---|
| 475,884 A * | 5/1892 | Murrey | 99/388 |
| 1,208,020 A * | 12/1916 | Ross | B65D 7/26 220/485 |
| 1,312,616 A | 8/1919 | Cowan | |
| 1,733,137 A * | 10/1929 | Spang | 99/400 |
| 2,849,947 A * | 9/1958 | Bork | 99/402 |
| 2,941,463 A * | 6/1960 | Di Cuia | 99/393 |
| 2,962,957 A * | 12/1960 | Bork | 99/402 |

(Continued)

OTHER PUBLICATIONS

International Search Report from corresponding International Application No. PCT/US2012/047876, mailed Jan. 7, 2013.

*Primary Examiner* — Phuong Nguyen
(74) *Attorney, Agent, or Firm* — Polster Lieder (57) ABSTRACT

A containing assembly for a food product for use as a culinary tool to assist in preventing thermal injury to a user while inserting and retrieving the food product from a toaster slot, the assembly including a support assembly defining a basket for receiving and retaining the food product, and having a support frame with a u-shaped bar with two side bars and a base bar and two articulating side walls coupled to the bottom of the support frame, the rotatable side wall rotates about an axis proximate the bottom of the support frame. A stop restricts the outward rotation of the rotatable side wall at a predefined open position. A handle is fixedly coupled to one of the two side bars of the support frame and configured for inserting and retrieving the support assembly from the toaster slot with a single user hand.

32 Claims, 5 Drawing Sheets

(56) References Cited

U.S. PATENT DOCUMENTS

| | | | |
|---|---|---|---|
| 3,046,870 A * | 7/1962 | Bork | 99/402 |
| 3,094,061 A * | 6/1963 | Cole | 99/402 |
| 3,564,992 A | 2/1971 | Sattes | |
| 4,184,419 A * | 1/1980 | Ponte | 99/402 |
| 4,290,349 A * | 9/1981 | Fiorenza | 99/388 |
| 4,656,927 A | 4/1987 | Mosby et al. | |
| 5,305,686 A * | 4/1994 | Svensson | A47J 37/1295 211/126.1 |
| D384,858 S | 10/1997 | Kurz | |
| 5,735,191 A * | 4/1998 | Russell et al. | 99/339 |
| 5,853,781 A | 12/1998 | Bono et al. | |
| 6,267,044 B1 * | 7/2001 | Friel, Sr. | A47J 37/0814 219/386 |
| 6,526,876 B2 * | 3/2003 | Kahler et al. | 99/394 |
| D584,917 S * | 1/2009 | Mullen | D7/390 |
| D592,010 S | 5/2009 | Russell et al. | |
| 2006/0180034 A1 | 8/2006 | Arend | |
| 2009/0293737 A1 * | 12/2009 | Davis | 99/394 |

\* cited by examiner

FOOD PRODUCT CONTAINMENT ASSEMBLIES FOR USE WITH A TOASTER

CROSS-REFERENCE TO RELATED APPLICATIONS

This application is a National Stage of International Application No. PCT/US2012/047876, filed Jul. 23, 2012, which claimed the benefit of U.S. Provisional Application No. 61/510,922, filed on Jul. 22, 2011, and U.S. Provisional Application No. 61/650,664, filed on May 23, 2012, the disclosures of each being incorporated herein by reference.

FIELD

The present disclosure relates to cooking and, more specifically, to an assembly for cooking food products using a toaster.

BACKGROUND

The statements in this section merely provide background information related to the present disclosure and may not constitute prior art.

Persons utilizing slotted toasters can have problems removing food products from the slotted toasters without suffering injury, particularly thermal injury. Persons utilizing slotted toasters can suffer thermal injury when reaching into the slots to retrieve food products from the slotted toasters either after or before completion of the toasting cycle. Moreover, persons utilizing toasters can suffer thermal injury from the heated food product itself when grabbing the toasted food product from the slotted toaster. Accordingly, an instrument is needed to assist preventing thermal injury to a user while inserting and retrieving heated food products from slotted toasters.

Prior attempts to solve this problem have been less than successful and have been found to not provide an adequate cooking solution. For instance, U.S. Pat. No. D384,858 by Kurz provides a sandwich holder that can be inserted into a slot of a toaster. However, as shown the Kurz sandwich holder has a closed side that allows for heating of the enclosed food product such as a sandwich, but does not allow for toasting thereof. This is similarly a characteristic of U.S. Pat. No. 3,564,992 by Sattes that is specifically designed for broiling of a food product. U.S. Pat. No. D584,917 by Mullen illustrates a toaster grill that can toast a food product, but that blocks a portion of the food product at the bottom from being toasted. This design also suffers from the undesirable inherent characteristic that the bottom traps any fallen food within the assembly at the bottom of the assembly. Further, in the Mullen design, two hands are required to close and open the assembly and thereby for inserting and removing the assembly and the food product contained therein. This is similarly an undesirable characteristic of U.S. Pat. No. 4,184,419 by Ponte. Both Mullen and Ponte also suffer from the inability to enclose the ends of the food product which can result in a portion of the food product from extending outward within the slot of the toaster during insertion therein. The two handled operation is also an inherent limitation of U.S. Pat. No. 1,312,616 by Cowan; U.S. Pat. Nos. 2,849,947 and 2,962,957 each by Bork; U.S. Pat. No. 3,094,061 by Cole; and U.S. Pat. No. D592,010 by Russel et al. U.S. Patent Publication No. 2009/0293737 by Davis provides a removable toaster basket assembly wherein the handle can be removed from a food holding basket with a single hand, but where the food product can only be removed from the food holding basket by dumping or turning the entire assemble nearly upside down to dispense the heated food product. Each of these references suffers from limitations as will be described as being solved by the present disclosure.

SUMMARY

The inventor hereof has succeeded at designing that are capable of inserting a food product, and inserting the assembly with the food product into a slot in a slotted toaster. The assembly is configured to center the food product within the assembly to assist in properly positioning the food product within the slot of the toaster. The assembly locks the side walls in a defined outwardly rotating distance to enable the insertion of the food product without restricting the inward rotation of the side walls to collapse and restraint the food product in the centered position. The assembly and method are configured for interacting with the internal slot mechanisms of the toaster so as to activate the desired heating and toasting operations of the toaster for the toasting of the entire inserted food product. The assembly is configured so as to minimize the capturer or retention of any fallen portions of the food product on the assembly. The entire food product is captured within a collapsible cavity defined between two side walls while having closed ends for capturing the entire food product. The collapsible side walls interact with the collapsing sides of the slot of the toaster for proper toasting positioning of the food product within the slot during toasting. After the toasting process is complete, a single hand of the user removes the assembly with the toasted food product from the slot and can dispense the heated food product from the cavity of the assembly by a rotation of the hand of less than 90 degrees. The assembly is configured of a coated wire frame that minimizes the heat retention and subsequent transfer to the user that comes into contact with the assembly.

As such, this disclosure provides improved toaster system and method that assists a user in the insertion and removal of a food product from a slotted toaster and that assists in preventing thermal injury to the user while removing the assembly from the slotted toaster and removing the food product from the assembly.

According to one aspect, a containing assembly for a food product for use as a culinary tool to assist in preventing thermal injury to a user while inserting and retrieving the food product into and out of a toasting slot of a toaster. The assembly including a support assembly defining a basket for receiving and retaining the food product. The basket assembly having a support frame including a u-shaped bar having two side bars and a base bar and two articulating side walls coupled to the bottom of the support frame. The rotatable side wall rotates about an axis proximate the bottom of the support frame. A stop is configured to restrict the outward rotation of the rotatable side wall at a predefined open position. A handle is fixedly coupled to one of the two side bars of the U-shaped support frame, the handle is configured for inserting and retrieving of the support assembly from the slot of the toaster with a single hand of the user.

According to another aspect, a containing assembly including a holder configured to hold the food product, the holder being configured to be inserted within the toaster slot and includes a supporter configured to support the food product. The holder includes a pivot configured to permit the pivoted opening and closing of the holder between an open position and a closed position and a pivot-restrictor configured to restrict such pivoted opening and closing to one or more acute angles. The assembly also includes an insertion-assistor configured to assist the user in inserting the holder into the slot and a retrieval-assistor configured to assist the user in retrieving the holder from the slot. The culinary tool assists preventing thermal injury to the user by minimizing contact between the user and the slotted toaster during inserting and retrieving the food product into and out of the slot of the toaster.

According to yet another aspect, a containing assembly including holder means for holding the food product and supporter means for supporting the food product in the holder means. The assembly also includes pivot means for permitting pivoted opening and closing of the holder means between an open position and a closed position and pivot-restrictor means for restricting the pivoted opening and closing of the pivot means to a predefined acute angle. The assembly further includes insertion-assistor means for assisting the user in inserting the holder means into the slot and retrieval-assistor means for assisting the user in retrieving the holder means from the slot.

According to still another aspect, a toasting method, relating to assisting preventing thermal injury to a user while inserting and retrieving a toastable food product into and out of a slot of slotted toaster. The method includes the steps of placing the toastable food product in a container having a holder configured to hold the food product and to fit within the toaster slot. The assembly includes a handle configured to assist the user in inserting and retrieving the container into and out of the slot by use of a single hand. The assembly includes a hinged wall to permit pivoted opening and closing of the container, and a pivot-restrictor to restrict such pivoted opening and closing to an acute angle. The assembly can include a food-grade silicone coating configured to restrict heat transfer between the container and the slotted toaster, and wherein such food-grade silicone coating is further configured to restrict heat transfer between the container and the user's hand. The method also includes inserting the container into the slot of the toaster using the handle with a single hand, lifting vertically the container from the slot using the handle upon completion of a toasting time period and holding the container in an upright position with respect to the ground. The method also includes allowing the hinged wall to open from the closed position to the open position by gravity assistance and pouring the toastable food product onto a serving surface. This method assists in the prevention of thermal injury to the user by minimizing contact between the user and the slotted toaster and between the user and the toastable food product.

A containing assembly including a holder configured to hold the food product and to fit within the toaster slot. The holder includes a supporter configured to support the food product and a hinged wall configured to permit pivoted opening and closing of the holder between an open position and a closed position. The hinged wall has a pivot-restrictor configured to restrict such pivoted opening and closing to between about fifteen degrees and about forty-five degrees. A handle is configured to assist the user to insert and retrieve the holder into and out of the slot. The holder includes a food-grade silicone coating configured to resist heat transfer between the culinary tool and the slot of the toaster. The food-grade silicone coating is configured to resist heat transfer between the culinary tool and the user's skin; and to resist impact between the culinary tool and the object, and to repel water-accumulation on the culinary tool. A first automatic-shifter is configured to automatically shift the holder from the closed position to the open position upon retrieval of the holder from the slot and a second automatic-shifter configured to automatically shift the holder from the open position to the closed position upon insertion of the holder into the slot.

Further aspects of the present disclosure will be in part apparent and in part pointed out below. It should be understood that various aspects of the disclosure can be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

It should be understood that throughout the drawings, corresponding reference numerals indicate like or corresponding parts and features.

DETAILED DESCRIPTION

The following description is merely exemplary in nature and is not intended to limit the present disclosure or the disclosure's applications or uses.

In one embodiment, a containing assembly is provided for a food product for use as a culinary tool to assist in preventing thermal injury to a user while inserting and retrieving the food product into and out of a toasting slot of a toaster. The assembly includes a support assembly defining a basket for receiving and retaining the food product, the support assembly has a support frame including a u-shaped bar having two side bars and a base bar.

The support assembly also includes two articulating side walls coupled to the bottom of the support frame, at least one of the side walls rotatable about an axis proximate the bottom of the support frame. In some embodiments, one or more side wall is rotatable outwardly and inwardly from a vertical position relative to the side bars of the u-shaped support frame.

In some embodiments, the rotatable side wall is rotatable outwardly and inwardly from a vertical position relative to the side bars of the u-shaped support frame, each of the two side walls of the support assembly are rotatable about axes that are parallel to each other and each being proximate to the bottom of the support frame.

A stop is configured for restricting the outward rotation of the rotatable side wall at a predefined open position. In one embodiment, the stop is configured to not restrict the inward rotation of the side wall.

The handle is fixedly coupled to one of the two side bars of the U-shaped support frame, the handle is configured for inserting and retrieving of the support assembly from the slot of the toaster with a single hand of the user.

In some embodiments, the support frame includes two parallel bars each being a u-shaped bar and being spaced apart and coupled at the top with a loop and being coupled with one or more connecting bars. In some such embodiments, the support frame has one or more cross pieces coupling the base bars of each of the two parallel bars together at the bottom of the support frame. The cross pieces can extend outwardly in a downward direction from the base bars. For example, the cross pieces can have a convex shape in the downward direction away from the base bar, such as having a V-shape or a U-shape extending downward and outward from the base bars.

In some embodiments, the support frame can includes a pivot restricting bar attached to the cross pieces at a midpoint between the two parallel bars, and wherein each side wall includes a foot portion configured as a stop for selectively engaging with the pivot restricting bar for restricting the outward rotation of the at least one rotating side wall. In some embodiments, the pivot restricting bar and foot portion are configured to not restrict the inward rotation of each rotating side wall.

Where there are two parallel bars, embodiments can include a handle bar extending from the one side bar for forming the handle. As such, in some embodiments, a handle fixture is attached to each of the handle bars for forming the handle.

In some embodiments, each rotatable side wall is rotatable about the base bar. The rotatable side wall can include a plurality of hinge bars forming the side wall and a support bar coupling each of the hinge bars proximate to a lower end of the hinge bars. The support bar can engage the base bar and rotate about a surface of the base bar during rotation of the rotatable side wall. In some embodiments, the support frame includes a pivot restricting bar proximate to and parallel with the base bar and one or more of the hinge bars can include an L-shaped extension below the support bar configured that selectively engages the pivot restricting bar for restricting the outward rotation of the rotating side wall.

The support frame is a wire frame configured from a core wire. In some embodiments, the wire frame is coated with an insulating layer composed of a heat-resistant non-conductive material. For example, the wire frame can be coated with a silicone, which as one of skill in the art of culinary products would understand, would be a food-grade silicon or other coating.

According to another embodiment, a containing assembly including a holder configured to hold the food product, the holder being configured to be inserted within the toaster slot and includes a supporter configured to support the food product. The holder includes a pivot configured to permit the pivoted opening and closing of the holder between an open position and a closed position and a pivot-restrictor configured to restrict such pivoted opening and closing to one or more acute angles. The assembly also includes an insertion-assistor configured to assist the user in inserting the holder into the slot and a retrieval-assistor configured to assist the user in retrieving the holder from the slot. The culinary tool assists preventing thermal injury to the user by minimizing contact between the user and the slotted toaster during inserting and retrieving the food product into and out of the slot of the toaster.

In other embodiments, a containing assembly including holder means for holding the food product and supporter means for supporting the food product in the holder means. The assembly also includes pivot means for permitting pivoted opening and closing of the holder means between an open position and a closed position and pivot-restrictor means for restricting the pivoted opening and closing of the pivot means to a predefined acute angle. The assembly further includes insertion-assistor means for assisting the user in inserting the holder means into the slot and retrieval-assistor means for assisting the user in retrieving the holder means from the slot.

In one or more embodiments, a toasting method, relating to assisting preventing thermal injury to a user while inserting and retrieving a toastable food product into and out of a slot of slotted toaster. The method includes the steps of placing the toastable food product in a container having a holder configured to hold the food product and to fit within the toaster slot. The assembly includes a handle configured to assist the user in inserting and retrieving the container into and out of the slot by use of a single hand. The assembly includes a hinged wall to permit pivoted opening and closing of the container, and a pivot-restrictor to restrict such pivoted opening and closing to an acute angle. The assembly can include a food-grade silicone coating configured to restrict heat transfer between the container and the slotted toaster, and wherein such food-grade silicone coating is further configured to restrict heat transfer between the container and the user's hand. The method also includes inserting the container into the slot of the toaster using the handle with a single hand, lifting vertically the container from the slot using the handle upon completion of a toasting time period and holding the container in an upright position with respect to the ground. The method also includes allowing the hinged wall to open from the closed position to the open position by gravity assistance and pouring the toastable food product onto a serving surface. This method assists in the prevention of thermal injury to the user by minimizing contact between the user and the slotted toaster and between the user and the toastable food product.

In some embodiments, a containing assembly includes a holder configured to hold the food product and to fit within the toaster slot. The holder includes a supporter configured to support the food product and a hinged wall configured to permit pivoted opening and closing of the holder between an open position and a closed position. The hinged wall has a pivot-restrictor configured to restrict such pivoted opening and closing to between about fifteen degrees and about forty-five degrees. A handle is configured to assist the user to insert and retrieve the holder into and out of the slot. The holder includes a food-grade silicone coating configured to resist heat transfer between the culinary tool and the slot of the toaster. The food-grade silicone coating is configured to resist heat transfer between the culinary tool and the user's skin; and to resist impact between the culinary tool and the object, and to repel water-accumulation on the culinary tool. A first automatic-shifter is configured to automatically shift the holder from the closed position to the open position upon retrieval of the holder from the slot and a second automatic-shifter configured to automatically shift the holder from the open position to the closed position upon insertion of the holder into the slot.

In accordance with one exemplary embodiment hereof, a containing system relating to providing the culinary tool to assist preventing thermal injury to the user while inserting and retrieving the food product into and out of the slot of the slotted toaster, including the holder structured and arranged to hold the food product. The holder is structured and arranged to be inserted within the slot. The holder includes the supporter structured and arranged to support the food product. The holder includes the pivot structured and arranged to permit pivoted opening and closing of the holder between the open position and the closed position. The pivot includes the pivot-restrictor structured and arranged to restrict the pivoted opening and closing to the acute angle; and the insertion-assistor structured and arranged to assist the user to insert the holder into the slot; and the retrieval-assistor structured and arranged to assist the user to retrieve the holder from the slot. The culinary tool assists preventing thermal injury to the user by minimizing contact between the user and the slotted toaster while inserting and retrieving the food product into and out of the slot of the slotted toaster.

Moreover, the present assemblies provide a containing system further including the heat-resistor structured and arranged to resist heat transfer between the culinary tool and the slotted toaster. Additionally, this disclosure provides containing system wherein the heat-resistor is further structured and arranged to resist heat transfer between the culinary tool and the user's skin. Also, various embodiments provide a containing system having the heat-resistor includes the heat-resistant plastic. In addition, various embodiments provide a containing system with the heat-resistor includes silicone. And, one or more embodiments of the containment assembly provide a containing system wherein the heat-resistor includes food-grade silicone. Further, one or more embodiments of the containment assembly provides a containing system wherein the heat-resistor includes the food-grade silicone coating. Even further, one or more embodiments of the containment assembly provides a containing system further including the impact-attenuator structured and arranged to attenuate impact between the culinary tool and the slotted toaster. Moreover, one or more embodiments of the containment assembly provides a containing system further including the impact-attenuator structured and arranged to attenuate impact between the culinary tool and the object. Additionally, one or more embodiments of the containment assembly provides a containing system further including the releaser structured and arranged to release the food product from the holder upon occurrence of the first user action.

Also, one or more embodiments of the containment assembly provides a containing system wherein the releaser includes the first automatic-shifter structured and arranged to automatically shift the holder from the closed position to the open position upon occurrence of the first user action. In addition, one or more embodiments of the containment assembly provides a containing system further including the coupler structured and arranged to couple the releaser with the first automatic-shifter. And, one or more embodiments of the containment assembly provide a containing system wherein the first user action includes retrieval of the holder from the slot. Further, one or more embodiments of the containment assembly provides a containing system further including the second automatic-shifter structured and arranged to automatically shift the holder from the open position to the closed position upon occurrence of the second user action. Even further, one or more embodiments of the containment assembly provides a containing system wherein the second user action includes insertion of the holder into the slot. Moreover, one or more embodiments of the containment assembly provides a containing system further including the water-repelling structured and arranged to repel water accumulation on the culinary tool. Additionally, one or more embodiments of the containment assembly provide a containing system wherein the pivot includes the hinged wall. Also, one or more embodiments of the containment assembly provides a containing system further including the centering structured and arranged to center the food product within the depth of the supporter. In addition, one or more embodiments of the containment assembly provide a containing system wherein the hinged wall is structured and arranged to disassemble from the supporter. And, one or more embodiments of the containment assembly provide a containing system wherein the acute angle is between about fifteen degrees and about forty-five degrees. Further, one or more embodiments of the containment assembly provides a containing system wherein the acute angle is about thirty degrees.

Even further, one or more embodiments of the containment assembly provides a containing system wherein the retrieval-assistor includes the handle. One or more embodiments of the containment assembly provide a containing system wherein the insertion-assistor includes the handle. In accordance with another exemplary embodiment hereof, this disclosure provides a containing system, relating to providing the culinary tool to assist preventing thermal injury to the user while inserting and retrieving the food product into and out of the slot of the slotted toaster, including holder means for holding the food product. The holder means includes supporter means for supporting the food product. The holder means includes pivot means for permitting pivoted opening and closing of the holder means between the open position and the closed position. The pivot means can include pivot-restrictor means for restricting the pivoted opening and closing to the acute angle. The insertion-assistor means can assist the user to insert the holder means into the slot. The retrieval-assistor means assists the user to retrieve the holder means from the slot. The culinary tool assists preventing thermal injury to the user by minimizing contact between the user and the slotted toaster while inserting and retrieving the food product into and out of the slot of the slotted toaster. Additionally, one or more embodiments of the containment assembly provides a containing system further including heat-resistor means for resisting heat transfer between the culinary tool and the slotted toaster and between the culinary tool and the user's skin. Also, one or more embodiments of the containment assembly provides a containing system further including impact-attenuator means for attenuating impact between the culinary tool and the slotted toaster. In addition, one or more embodiments of the containment assembly provides a containing system further including impact-attenuator means for attenuating impact between the culinary tool and the object. And, one or more embodiments of the containment assembly provides a containing system further including releaser means for releasing the food product from the holder upon the occurrence of the first user action.

Further, one or more embodiments of the containment assembly provides a containing system wherein such releaser means includes first automatic-shifter means for automatically shifting such holder means from such closed position to the open position upon the occurrence of the first user action. Even further, one or more embodiments of the containment assembly provides a containing system further including coupler means for coupling such releaser means with such first automatic-shifter means. Even further, one or more embodiments of the containment assembly provides a containing system further including second automatic-shifter means for shifting such holder means from the open position to the closed position upon the occurrence of the second user action. Even further, one or more embodiments of the containment assembly provides a containing system further including water-repelling means for repelling water accumulation on the culinary tool.

In one or more embodiments of the containment assembly provides a containing system further including centering means for centering the food product within the depth of such supporter means. In accordance with another exemplary embodiment hereof, this disclosure provides a toasting method, relating to assisting preventing thermal injury to the user while inserting and retrieving the toastable food product into and out of the slot of the slotted toaster, including the steps of: placing the toastable food product in the container including the holder structured and arranged to hold the food product, wherewith holder is further structured and arranged to fit within the slot, and the handle structured and arranged to assist the user to insert and retrieve the container into and out of the slot, the hinged wall structured and arranged to permit pivoted opening and closing of the container, and the pivot-restrictor structured and arranged to restrict such pivoted opening and closing to the acute angle wherein the container includes the food-grade silicone coating structured and arranged to restrict heat transfer between the container and the slotted toaster, and wherein such on food-grade silicone coating is further structured and arranged to restrict heat transfer between the container and the user's hands. The method includes inserting the container into the slot using the handle and lifting vertically the container from the slot using the handle upon completion of the toasting time period. The method also includes holding the container in the upright position with respect to the ground and allowing the hinged wall to open from the closed position to the open position by gravity assistance such as pouring the toastable food product onto the serving surface. As such, the described toasting method assists preventing thermal injury to the user by minimizing contact between the user and the slotted toaster and between the user and the toastable food product.

In accordance with another exemplary embodiment hereof, this disclosure provides a containing system, relating to providing the culinary tool for assisting preventing thermal injury to the user while inserting and retrieving the food product into an out of the slot of the slotted toaster, including the holder structured and arranged to hold the food product.

In some embodiments, the holder can be structured and arranged to fit within the slot. The holder includes the supporter structured and arranged to support the food product. The holder further includes the hinged wall structured and arranged to permit pivoted opening and closing of the holder between the open position and the closed position. The hinged wall can include the pivot-restrictor structured and arranged to restrict such pivoted opening and closing to between about fifteen degrees and about forty-five degrees; and the handle structured and arranged to assist the user to insert and retrieve the holder into and out of the slot. The food-grade silicone coating can be structured, selected and arranged to resist heat transfer between the culinary tool and the slotted toaster. The food-grade silicone coating is further structured and arranged to resist heat transfer between the culinary tool and the user's skin; and wherein the food-grade silicone coating is further structured and arranged to resist impact between the culinary tool and the object. The food-grade silicone coating can be structured and arranged to repel water-accumulation on the culinary tool.

The first automatic-shifter can be structured and arranged to automatically shift the holder from the closed position to the open position upon retrieval of the holder from the slot. The second automatic-shifter structured and arranged to automatically shift the holder from the open position to the closed position upon insertion of the holder into the slot. The culinary tool assists preventing thermal injury to the user by minimizing contact between the user and the slotted toaster while inserting and retrieving the food product into and out of the slot of the slotted toaster. In addition, this disclosure provides each and every novel feature, element, combination, step and/or method disclosed or suggested by this patent application.

Figures 1A, 1B:
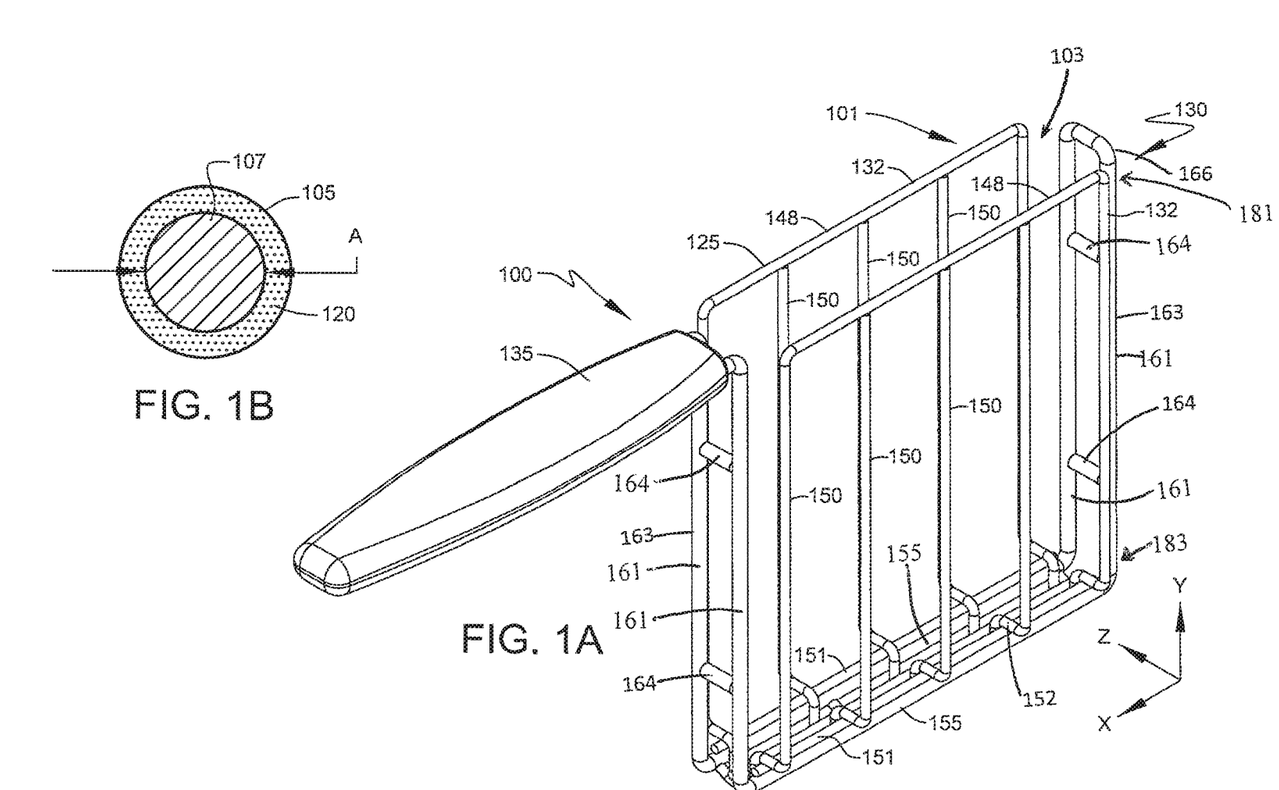
FIG. 1A shows a perspective view, illustrating a toast basket assembly of a toast containing system, according to one exemplary embodiment of the present disclosure.
FIG. 1B shows a sectional view, illustrating a coated wire of the toast basket assembly, according to one exemplary embodiment of FIG. 1A.

Referring now to FIG. 1A shows a perspective view, illustrating toast basket assembly 101 of toast containing system 100, according to an exemplary embodiment of the present disclosure.

Figure 2:
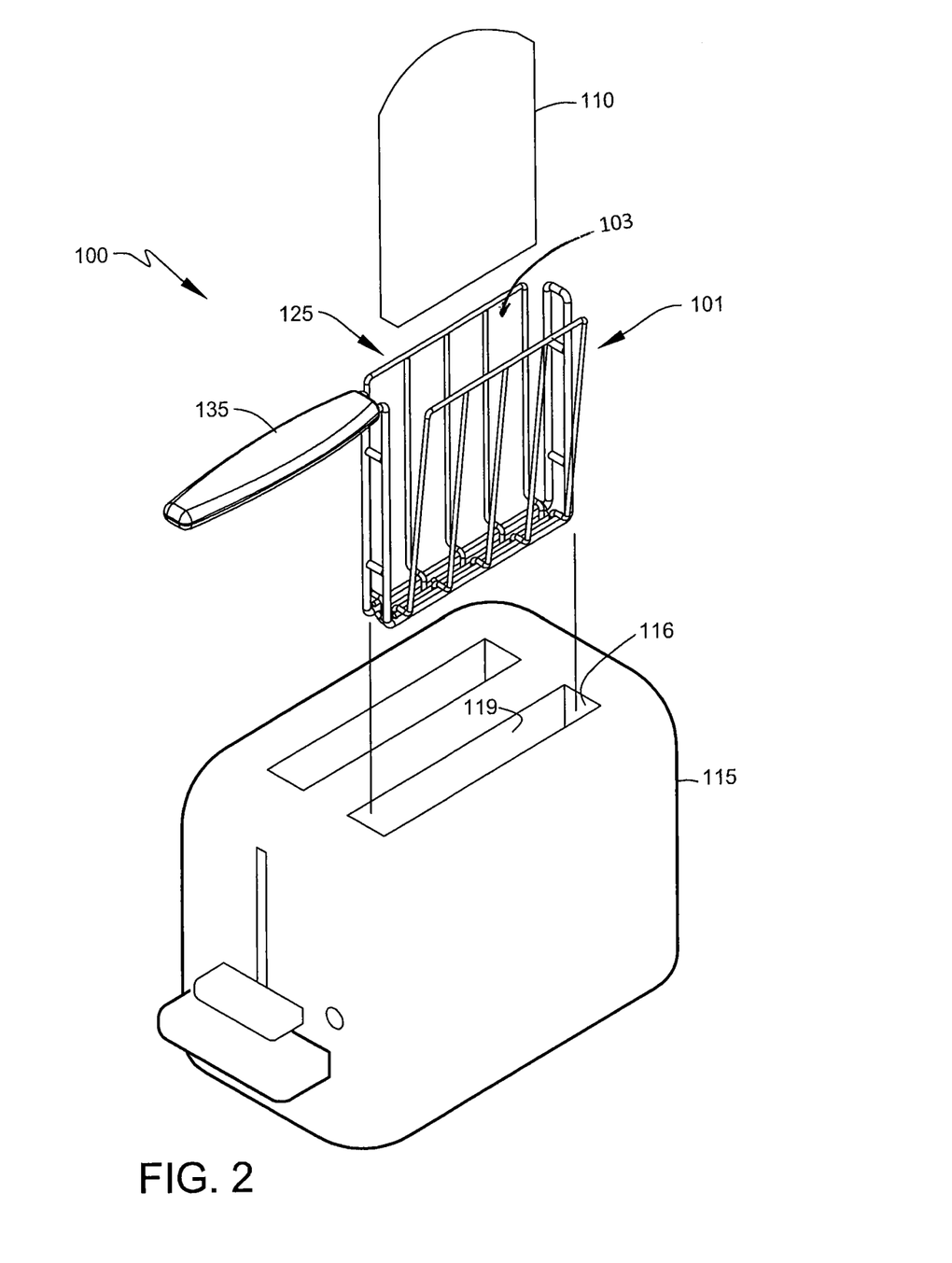
FIG. 2 shows a perspective view, illustrating the toast basket assembly in use, according to one exemplary embodiment of FIG. 1A.

FIG. 1B shows a sectional view, illustrating coated wire 105 of toast basket assembly 101, according to the exemplary embodiment of FIG. 1A. FIG. 2 shows a perspective view, illustrating toast basket assembly 101 in use, according to the exemplary embodiment of FIG. 1A. Toast basket assembly 101 is designed to assist a user to insert and retrieve a food product 110 into and out of a slotted toaster 115, as shown in FIG. 2. Toast basket assembly 101 is designed to assist preventing thermal injury to the user by minimizing contact between the user's hands and slotted toaster 115.

Furthermore, toast basket assembly 101 is designed to assist preventing thermal injury to the user by minimizing contact between the user's hands and food product 110 after food product 110 is heated in slotted toaster 115. In addition, surfaces of toast basket assembly 101 can be coated with an insulating layer 120, as shown in FIG. 1B. Insulating layer 120 having in some exemplary embodiments a heat-resistor structured and arranged to resist heat transfer between the culinary tool and the slotted toaster that resists heat transfer from slotted toaster 115 to toast basket assembly 101 in order to prevent thermal injury to a user. Moreover, insulating layer 120 having in some exemplary embodiments the heat-resistor is further structured and arranged to resist heat transfer between the culinary tool and the user's skin; and including heat-resistor means for resisting heat transfer between the culinary tool and the slotted toaster and between the culinary tool and the user's skin that resists heat transfer between toast basket assembly 101 and the skin of the user's hands. Upon reading this specification, those with ordinary skill in the art will now appreciate that, under appropriate circumstances, considering such issues as design preference, manufacturing preferences, user preferences, cost, changing needs, future technologies, by way of example, other coating configurations, such as, for example, select surface coatings, multiple surface coating layers are also within the scope of the present disclosure.

Toast basket assembly 101 defines a cavity or basket 103 for holding the food product therein. The basket assembly 101 includes a holder portion 125 having in some exemplary embodiments a holder structured and arranged to hold the food product; and including holder means for holding the food product. This includes the handle portion 135, as shown in FIG. 1A. Holder portion 125 is structured and arranged to contain food product 110, as shown in FIG. 2, in cavity or basket 103. Holder portion 125 is further structured and arranged to insert within the slot 116 of slotted toaster 115, as shown in FIG. 2, this exemplary embodiment including the holder is further structured and arranged to insert within the slot. Holder portion 125 includes the support frame 130 having in some exemplary embodiments the supporter structured and arranged to support the food product. The holder means can include supporter means for supporting the food product, as shown (also see FIG. 4). Holder portion 125 includes the articulating side wall 132, two articulating side walls 132, as shown. Upon reading this specification, those with ordinary skill in the art will now appreciate that, under appropriate circumstances, considering such issues as design preference, manufacturing preferences, user preferences, cost, changing needs, future technologies, and other configurations, such as, for example, multiple walls, multiple handles, is also within the scope of the present disclosure.

Handle portion 135 having in some exemplary embodiments one or more insertion-assistors structured and arranged to assist the user to insert the holder into the slot. The retrieval-assistor can be structured and arranged to assist the user to retrieve the holder from the slot. The insertion-assistor means can assist the user in inserting the holder means into the slot, the retrieval-assistor means can assist the user in retrieving such holder means from the slotted toaster, which is employed by the user to insert and retrieve toast basket assembly 101 into and out of slotted toaster 115, as shown in FIG. 2. Upon reading this specification, those with ordinary skill in the art will now appreciate that, under appropriate circumstances, considering such issues as design preference, manufacturing preferences, user preferences, cost, changing needs, future technologies, toaster type, by way of example, other handle embodiments, such as, for example, multiple handles, other handle configurations are also within the scope of the present disclosure.

Figure 3:
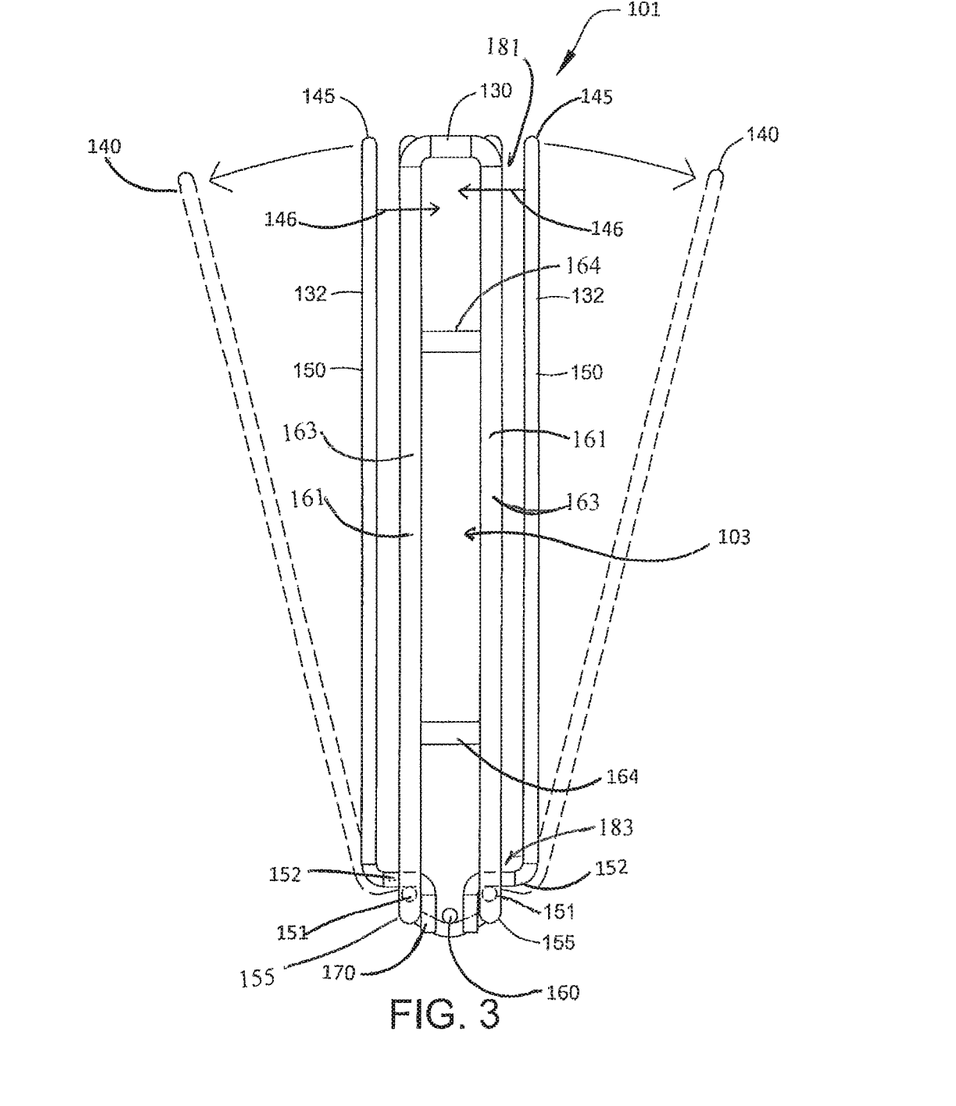
FIG. 3 shows and end view, illustrating shifting of the articulating side walls of the toast basket assembly between an open position (shown in dashed lines) and a closed position (shown in solid lines), according to one exemplary embodiment of FIG. 1A.

FIG. 3 shows an end view, illustrating shifting of articulating side walls 132 between the open position 140 (shown as dashed lines) and the closed position 145 (shown by solid lines), according to the exemplary embodiment of FIG. 1A. Holder portion 125 shifts between open position 140 and closed position 145, as shown. While shown as a fixed closed position, in some embodiments, the side walls 132 are unrestricted in their inward movement and can move inwardly towards the food product and thereby collapsing on the food product to hold the food product therein. Upon insertion of holder portion 125 into slot 116 of slotted toaster 115, articulating side walls 132 shift from open position 140 to closed position 145 in order to fit holder portion 125 within the dimensions of slot 116 of slotted toaster 115, as shown and as described in more details herein. In some embodiments, the side walls 132 are collapsible inward (as shown in FIG. 3 by position 146 as the assembly is placed into the slot 116. The bottom portion of the assembly 101 reaches the bottom portion of the slot 116 and activates the toaster mechanism in which the sides 119 of the toaster slot 116 collapse in toward from the sides 119 to engage the side walls 132. The side walls 132 thereby rotate inwardly towards the food product 110 held within cavity 103 to center and hold the food product 110 in a compressed toasting position. As such, the side walls 132 react and cooperate with the side walls 119 of the toaster for properly toasting of the food product 110.

Upon removal of holder portion 125 from slotted toaster 115, articulating side walls 132 shift to open position 140, by gravity assistance, as shown and described in more detail herein. From open position 140, the user can pour or slide heated food product 110 onto a serving surface. The above described exemplary embodiment minimizes contact between the user's hands and holder portion 125 in order to prevent thermal injury to the user. Furthermore, the above described exemplary embodiment minimizes contact between the user's hands and heated food product 110 in order to prevent thermal injury to the user.

In one exemplary use, the user inserts food product 110 within holder portion 125, as shown in FIG. 2 with placement of a toastable food product in the container. The user then inserts holder portion 125 in slot 116 using handle portion 135, as shown in FIG. 2 this embodiment includes inserting the container into the slot using the handle. The user then removes holder portion 125 from slot 116 using handle 135 after completion of the desired toasting time. In some embodiments, this includes lifting vertically the container from the slot using the handle upon completion of the toasting time period. The user then holds toast basket assembly 101 in an upright position with respect to the ground with the longitudinal axes of hinge bars 150 approximately aligned with the vertical axis Y (see FIG. 1A), momentarily, to allow articulating side walls 132 to shift to open position 140 by gravity assistance. In this embodiment, this includes holding the container in an upright position with respect to the ground and allowing the hinged wall to open from the closed position to the open position by gravity assistance. Once the articulating side walls 132 have shifted to the open position 140, the user can then pour or slide heated food product 110 onto a serving surface. Upon reading this specification, those with ordinary skill in the art will now appreciate that, under appropriate circumstances, considering such issues as design preference, manufacturing preferences, user preferences, cost, changing needs, future technologies, toaster type, by way of example, other methods of use, such as, for example, removing and pouring the food product from a horizontal position are also within the scope of the present disclosure.

Figure 4:
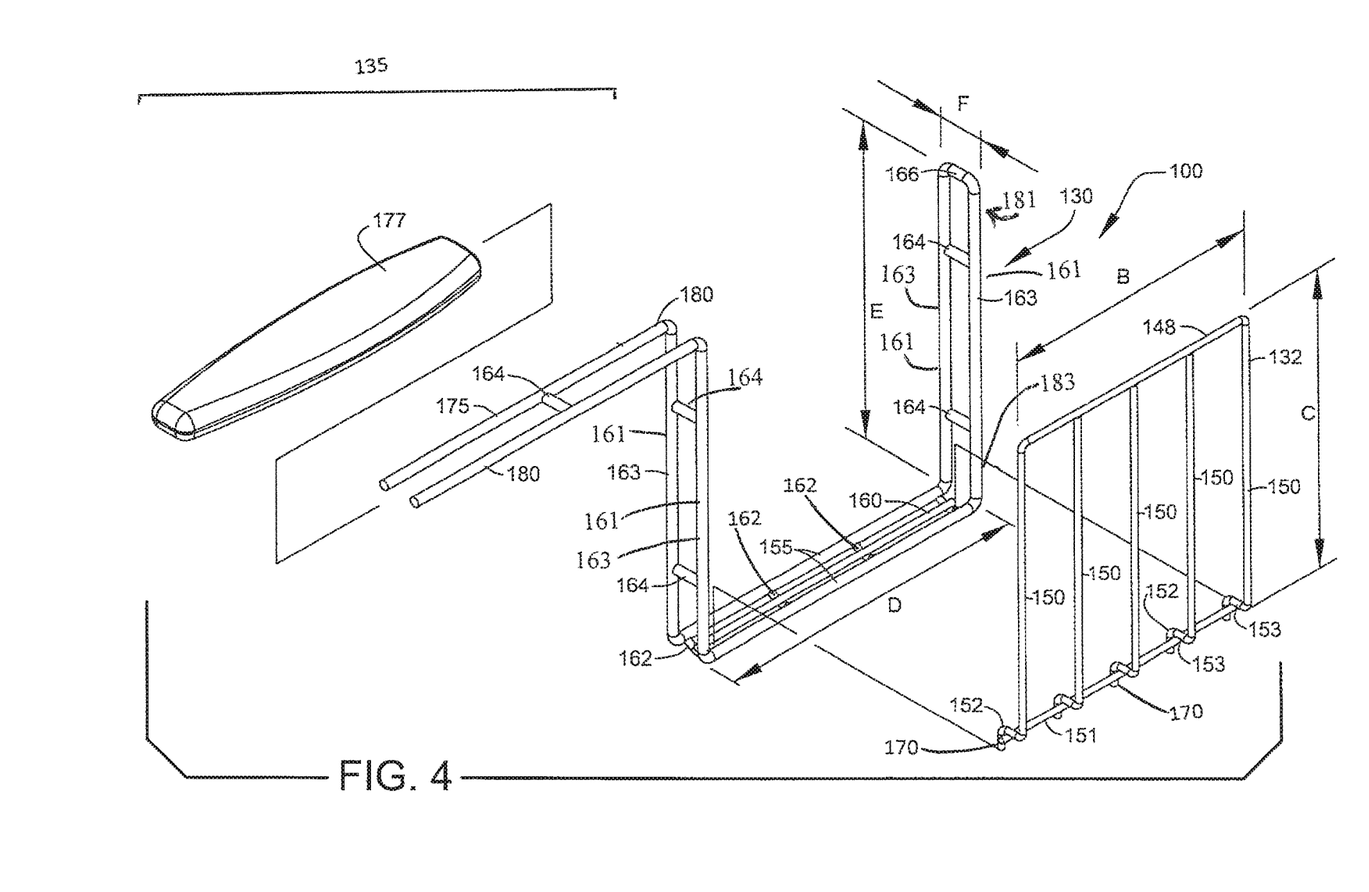
FIG. 4 shows an exploded view, illustrating an articulating side wall separated from the support frame and handle portion, according to one exemplary embodiment of FIG. 1A.

FIG. 4 shows an exploded view, illustrating articulating side wall 132 separated from support frame 130 and handle portion 135, according to the exemplary embodiment of FIG. 1A. Articulating side walls 132 disassociate from support frame 130, as shown wherein the hinged wall is structured and arranged to disassemble from the supporter. In use, the user separates articulating side walls 132 from support frame 130 by pulling articulating side walls 132 away from support frame 130. Upon reading this specification, those with ordinary skill in the art will now appreciate that, under appropriate circumstances, considering such issues as design preference, manufacturing preferences, user preferences, cost, changing needs, future technologies, by way of example, other configurations, such as, for example, permanently attached walls, non-separable walls are also within the scope of the present disclosure.

Each articulating side wall 132 includes the top bar 148 and the support bar 151, as shown in FIG. 4. Each articulating side wall 132 further includes the hinge bar 150, five hinge bars 150, as shown in FIG. 4. Upon reading this specification, those with ordinary skill in the art will now appreciate that, under appropriate circumstances, considering such issues as design preference, manufacturing preferences, user preferences, cost, changing needs, future technologies, by way of example, other hinge bar exemplary embodiments, such as, for example, fewer hinge bars, more hinge bars are also within the scope of the present disclosure.

Each hinge bar 150 includes the L-shaped portion 152, as shown. Each L-shaped portion 152 sits on, and is welded to, support bar 151 at positions 153, as shown in FIG. 4. Upon reading this specification, those with ordinary skill in the art will now appreciate that, under appropriate circumstances, considering such issues as design preference, manufacturing preferences, user preferences, cost, changing needs, future technologies, by way of example, other hinge configurations, such as, for example, piano hinges, barrel hinges, other hinging structures are also within the scope of the present disclosure.

Support frame 130 includes two U-shaped bars 163, as shown. U-shaped bars 163 having two opposing side end bars 161, a first side end bar 161 and a second side end bar 161 and each having a top end 181 and a bottom end 183 and having a base bar 155 with the two U-shaped bars 163 being connected by the connection bar 164, four connection bars 164 connecting the corresponding side end bars 161 of each U-shaped bar 163, as shown. Connection bars 164 run perpendicular to the side end bars 161 of the two U-shaped bars 163, as shown. U-shaped bars 163 are further connected by the loop 166, as shown. Upon reading this specification, those with ordinary skill in the art will now appreciate that, under appropriate circumstances, considering such issues as design preference, manufacturing preferences, user preferences, cost, changing needs, future technologies, by way of example, other support configurations, such as, for example, more connection bars, fewer connection bars, a single support frame are also within the scope of the present disclosure.

Each U-shaped bar 163 includes the base bar 155, as shown in FIG. 4. In use, support bars 151 of articulating side walls 132 rest on base bar 155, as shown in FIG. 1A and FIG. 5B. Base bars 155 of each U-shaped bar 163 are connected by the cross piece 162, four cross pieces 162, as shown. Cross pieces 162 run perpendicular to base bars 155, as shown. Crosspieces 162 are welded or otherwise fixedly coupled to the base bars 155, as shown. Upon reading this specification, those with ordinary skill in the art will now appreciate that, under appropriate circumstances, considering such issues as design preference, manufacturing preferences, user preferences, cost, changing needs, future technologies, by way of example, other support configurations, such as, for example, more cross pieces, fewer cross pieces are also within the scope of the present disclosure.

Support frame 130 further includes the pivot-restricting bar 160 which runs parallel to base bars 155, as shown in FIG. 4. Pivot-restricting bar 160 runs between base bars 155, as shown. Pivot-restricting bar 160 sits on and is welded to the central regions of cross pieces 162, as shown. This exemplary embodiment disposes pivot-restricting bar 160 at a lower vertical position than base bars 155, as shown in FIG. 4. This exemplary embodiment establishes a V-shape to the bottom of support frame 130 and assists centering food product 110 within depth Z of holder portion 125 (see FIG. 1A). One such embodiment includes the centering structure arranged to center the food product within the depth of the assembly. The exemplary embodiment also provides a centering means for centering the food product within the depth of the supporter means. Upon reading this specification, those with ordinary skill in the art will now appreciate that, under appropriate circumstances, considering such issues as design preference, manufacturing preferences, user preferences, cost, changing needs, future technologies, by way of example, other centering configurations, such as, for example, clamps, well-shaped bottoms, other mechanical centering exemplary embodiments are also within the scope of the present disclosure.

In use, articulating side walls 132 having a pivot can include the hinged wall and the hinged wall structured and arranged to permit pivoted opening and closing of the holder between the open position and the closed position; and including the hinged wall structured and arranged to permit pivoted opening and closing of the container. Such pivoting is with respect to base bars 155 in order to shift between open position 140 and closed position 145, as shown in FIG. 3 and FIG. 5B (see further discussion below). Pivot-restricting bar 160 can include one or more pivots or pivot-restrictors structured and arranged to restrict the pivoted opening and closing to the acute angle. The pivot means can include pivot-restrictor means for restricting the pivoted opening and closing to the acute angle. These function to restrict pivoting motion between open position 140 and closed position 145 to an acute angle (see details below). Upon reading this specification, those with ordinary skill in the art will now appreciate that, under appropriate circumstances, considering such issues as design preference, manufacturing preferences, user preferences, cost, changing needs, future technologies, by way of example, other pivoting exemplary embodiments, such as, for example, other pivot-restricting mechanisms, no pivot restricting mechanisms are also within the scope of the present disclosure.

Handle portion 135 having one or more handle that is structured and arranged to assist the user in inserting and retrieving the container into and out of the slot such as by having a handle frame 175 and handle 177, as shown in FIG. 4. Handle frame 175 can include one or more handle bars 180, such as two handle bars 180 as shown in FIG. 4. Handle bars 180 run parallel to each other and are connected by the connection bar 164, as shown. Upon reading this specification, those with ordinary skill in the art will now appreciate that, under appropriate circumstances, considering such issues as design preference, manufacturing preferences, user preferences, cost, changing needs, future technologies, toaster type, by way of example, other handle exemplary embodiments, such as, for example, a single handle bar, curved handles, other handle shapes are also within the scope of the present disclosure.

In some embodiments, handle 177 can be composed of a plastic, a molded plastic, a molded polyvinyl chloride, or a composite. Upon reading this specification, those with ordinary skill in the art will now appreciate that, under appropriate circumstances, considering such issues as design preference, manufacturing preferences, user preferences, cost, changing needs, future technologies, by way of example, other handle materials, such as, for example, other plastics, other polymers, other materials are also within the scope of the present disclosure.

Figure 5A:
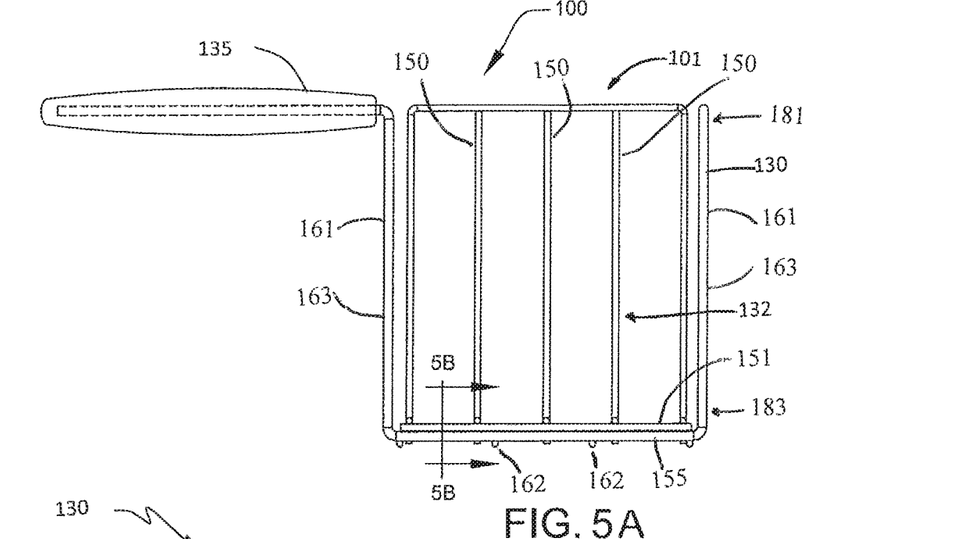
FIG. 5A shows a side view, illustrating the toast basket assembly, according to one exemplary embodiment of FIG. 1A.
Figure 5B:
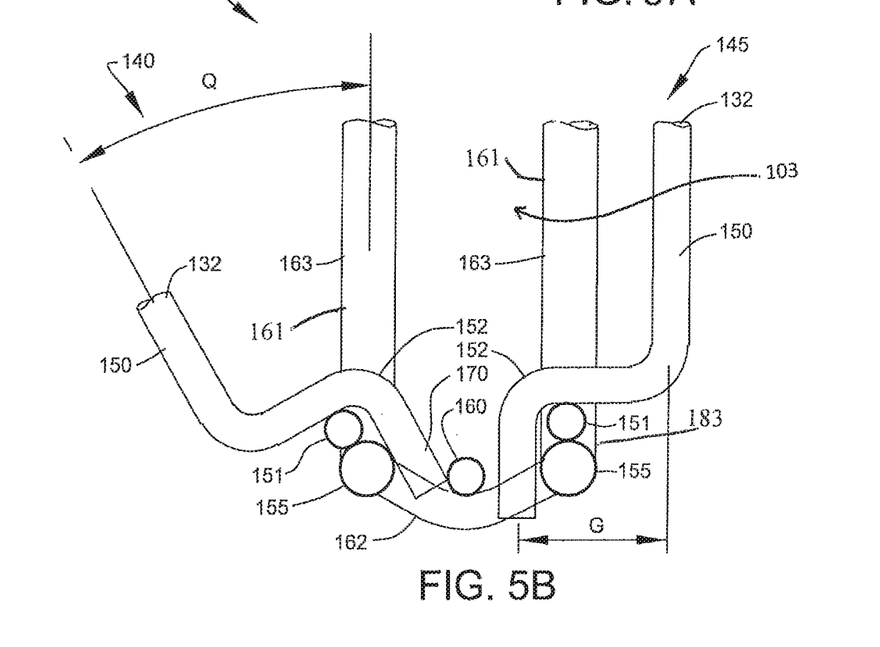
FIG. 5B shows a sectional view through the section 5-5 of FIG. 5A, illustrating the mechanism of pivoted opening and closing of the holder portion between the open position (shown on the left) and the closed position (shown on the right), according to one exemplary embodiment of FIG. 1A.

FIG. 5A shows a side view, illustrating toast basket assembly 101, according to the exemplary embodiment of FIG. 1A. FIG. 5B shows a sectional view through the section 5-5 of FIG. 5A, illustrating the mechanism of pivoted opening and closing of holder portion 125 between open position 140 (as shown on the left) and closed position 145 (as shown on the right), according to the exemplary embodiment of FIG. 1A.

Upon lifting holder portion 125 from slotted toaster 115 in a vertical direction with respect to the ground with the longitudinal axes of hinge bars 150 approximately aligned with vertical axis Y, as shown in FIG. 1B, articulating side walls 132 shift by gravity assistance to open position 140 by rotating away from support frame 130, as shown in FIG. 5B (as illustrated on the left). In this exemplary embodiment, there can be one or more releasers that include the first automatic-shifter structured and arranged to automatically shift the holder from the closed position to the open position upon occurrence of the first user action. In one exemplary embodiment the releaser means includes first automatic-shifter means for automatically shifting the holder means from the closed position to the open position upon the occurrence of the first user action. In this exemplary embodiment the first user action includes retrieval of the holder from the slot. Shifting of articulating side walls 150 to open position 140 upon removal of holder portion 125 from slotted toaster 115 releases food product 110 from the grasp of holder portion 125 that food product 110 can be poured onto the serving surface. In such exemplary embodiments the releaser can be structured and arranged to release the food product from the holder upon occurrence of the first user action; and this exemplary embodiment including herein releaser means for releasing the food product from the holder upon the occurrence of the first user action. In this exemplary embodiment, the coupler is structured and arranged to couple the releaser with the first automatic-shifter; and this exemplary embodiment including herein coupler means for coupling the releaser means with the first automatic-shifter means.

Articulating side walls 132 rotate away from support frame 130 by pivoted rotation with respect to base bars 155, as shown. Accordingly, base bars 155 can include one or more holders with one or more pivots that are structured and arranged to permit pivoted opening and closing of the holder between the open position and the closed position and herein embodying wherein the holder means includes pivot means for permitting pivoted opening and closing of the holder means between the open position and the closed position. These can include pivot points for rotatable opening and closing of articulating side walls 132, as shown. Articulating side walls 132 continue pivoted opening until foot portion 170 of L-shaped portion 152 touches pivot-restricting bar 160, as shown in FIG. 5B on the left. Pivoted rotation of articulating side wall 132 is halted at open position 140 once foot portion 170 touches pivot-restricting bar 160, as shown.

Pivot-restricting bar 160 can include the pivot that has one or more pivot-restrictors that are structured and arranged to restrict the pivoted opening and closing to the acute angle and a pivot means that includes pivot-restrictor means for restricting the pivoted opening and closing to the acute angle; and includes a hinged wall with the pivot-restrictor structured and arranged to restrict the pivoted opening and closing to between about fifteen degrees and about forty-five degrees. Such can limit the angle of rotation between open position 140 and closed position 145 to an acute angle Q of less than ninety degrees, as shown in FIG. 5B. In some embodiments, acute angle Q can be between about five to about forty-five degrees, or between about seven to about seventeen degrees, as shown. Upon reading this specification, those with ordinary skill in the art will now appreciate that, under appropriate circumstances, considering such issues as design preference, manufacturing preferences, user preferences, cost, changing needs, future technologies, by way of example, other angles, such as, for example, wider openings, more narrow openings, different opening angles are also within the scope of the present disclosure. Upon reading this specification, those with ordinary skill in the art will now appreciate that, under appropriate circumstances, considering such issues as design preference, manufacturing preferences, user preferences, cost, changing needs, future technologies, by way of example, other opening mechanisms, such as, for example, other mechanisms to limit pivoted opening, electronically-controlled opening, user-controlled opening, slidable opening mechanisms are also within the scope of the present disclosure. Upon reading this specification, those with ordinary skill in the art will now appreciate that, under appropriate circumstances, considering such issues as design preference, manufacturing preferences, user preferences, cost, changing needs, future technologies, and other pivot-restricting mechanisms are also within the scope of the present disclosure.

In closed position 145, articulating side walls 132 are separated by about seven-eighths of an inch when articulating side walls 132 are approximately parallel to each other, as shown in FIG. 3. In open position 140, articulating side walls 132 are separated by between about two and one-half and three and one-half inches. Upon reading this specification, those with ordinary skill in the art will now appreciate that, under appropriate circumstances, considering such issues as design preference, manufacturing preferences, user preferences, cost, changing needs, future technologies, the wall separation distances are also within the scope of the present disclosure.

Upon insertion of holder portion 125 into slot 116 of slotted toaster 115, as shown in FIG. 2, articulating side walls 132 shift from open position 140 to closed position 145, by upward pivoting motion with respect to base bar 155, as shown on the right in FIG. 5B, this exemplary embodiment including herein the second automatic-shifter structured and arranged to automatically shift the holder from the open position to the closed position upon occurrence of the second user action. In this exemplary embodiment the second automatic-shifter means shifts the holder means from the open position to the closed position upon the occurrence of the second user action; and this exemplary embodiment including wherein the second user action includes insertion of the holder into the slot. Articulating side walls 132 rotate upward in order to fit holder portion 125 within the dimensions of slot 116 of slotted toaster 115. Articulating side walls 132 will rotate upward until holder portion fits in slot 116, with articulating side walls 132 touching edges 119 of slot 116 as shown by way of example in FIG. 2. Accordingly, the degree of closure of articulating side walls 132 in closed position 145 will vary depending on the physical dimensions of slot 116. Articulating side wall 132 can be limited to a maximum closing angle when top bars 148 of articulating side walls 132 come into contact with each other, as shown. Upon reading this specification, those with ordinary skill in the art will now appreciate that, under appropriate circumstances, considering such issues as design preference, manufacturing preferences, user preferences, cost, changing needs, future technologies, other closing mechanisms, such as, for example, other mechanisms to limit pivoted closing, electronically-controlled closing, user-controlled closing, slidable closing mechanisms are also within the scope of the present disclosure.

Toast basket assembly 101 is comprised of coated wire 105, as shown in FIG. 1B. Coated wire 105 functions as the framing of toast basket assembly 101, as shown. Coated wire 105 includes core wire 107, as shown in FIG. 1B. Core wire 107 includes metallic wire. Upon reading this specification, those with ordinary skill in the art will now appreciate that, under appropriate circumstances, considering such issues as design preference, manufacturing preferences, user preferences, cost, changing needs, future technologies, by way of example, other frame materials, such as, for example, heat resistant plastics, silicone are also within the scope of the present disclosure. Upon reading this specification, those with ordinary skill in the art will now appreciate that, under appropriate circumstances, considering such issues as design preference, manufacturing preferences, user preferences, cost, changing needs, future technologies, by way of example, other framing exemplary embodiments, such as, for example, solid panel frames, wire mesh frames are also within the scope of the present disclosure.

Core wire 107 of toast basket assembly 101 includes diameter A of between about 0.1 inches and about 0.15 inches, as shown in FIG. 1B. Core wire 107 of support frame 130 includes a diameter A of about 0.1 inches. Core wire 107 of cross pieces 162 includes a diameter A of about 0.1 inches. Core wire 107 of handle frame 175 includes a diameter A of about 0.1 inches. Core wire 107 of connection bars 164 includes a diameter A of about 0.15 inches. Core wire 107 of pivot-restricting bar 160 includes a diameter A of about 0.1 inches. Core wire 107 of hinge bars 150 includes a diameter A of about 0.1 inches. Core wire 107 of support bar 151 includes a diameter A of about 0.1 inch. Upon reading this specification, those with ordinary skill in the art will now appreciate that, under appropriate circumstances, considering such issues as design preference, manufacturing preferences, user preferences, cost, changing needs, future technologies, wires of other diameters are also within the scope of the present disclosure.

Core wire 107 is coated with the insulating layer 120, as shown in FIG. 1B. Insulating layer 120 includes the heat-resistant and non-conductive material, the heat-resistant and non-conductive plastic, the silicone coating, the non-toxic silicone coating, the food-grade silicone coating. The embodiment can include the food-grade silicone coating structured and arranged to resist heat transfer between the culinary tool and the slotted toaster; and this exemplary embodiment including wherein the food-grade silicone coating is further structured and arranged to resist heat transfer between the culinary tool and the user's skin.

Insulating layer 120 includes a thickness of between about 0.1 millimeters to about 0.15 millimeters. Insulating layer 120 is thermally-resistive up to about 300° Celsius. The insulting layer can be applied or provided by any suitable means including, but not limited to, injection molding, spraying, and dip coating. When applied to a wire sub frame, e.g., formed from coated wire 105, the wire sub frame can act as a heat sink to pull heat build-up in the coating into the wire sub frame thereby cooling the coated surface. Upon reading this specification, those with ordinary skill in the art will now appreciate that, under appropriate circumstances, considering such issues as design preference, manufacturing preferences, user preferences, cost, changing needs, future technologies, by way of example, other coating materials, such as, for example, other plastic coatings, other polymer coatings, ceramic coatings, heat resistant paint coatings, other heat-stable coatings, multiple coating layers are also within the scope of the present disclosure.

Upon reading this specification, those with ordinary skill in the art will now appreciate that, under appropriate circumstances, considering such issues as design preference, manufacturing preferences, user preferences, cost, changing needs, by way of example, other coating thicknesses are also within the scope of the present disclosure. Insulating layer 120, by way of example including the heat-resistor structured and arranged to resist heat transfer between the culinary tool and the slotted toaster, functions to prevent thermal injury to the user by resisting heat transfer from slotted toaster 115 to toast basket assembly 101. Accordingly, insulating layer 120, by way of example including the heat-resistor is further structured and arranged to resist heat transfer between the culinary tool and the user's skin; and including herein heat-resistor means for resisting heat transfer between the culinary tool and the slotted toaster and between the culinary tool and the user's skin, can assist in preventing toast basket assembly 101 from getting hot and burning the user. Insulating layer 120 provides a smooth, rubbery surface to toast basket assembly 101.

Insulating layer 120, by way of example including the impact-attenuator structured and arranged to attenuate impact between the culinary tool and the slotted toaster; and including herein impact-attenuator means for attenuating impact between the culinary tool and the slotted toaster. The food-grade silicone coating can be structured, selected and arranged to resist impact between the culinary tool and the object can assist resisting abrasive impact between toast basket assembly 101 and slot 116 of slotted toaster 115 or other hard surfaces. Accordingly, insulating layer 120 having by way of example the impact-attenuator structured and arranged to attenuate impact between the culinary tool and the object; and including impact-attenuator means for attenuating impact between the culinary tool and the object, can assist preserving the surface integrity of toast basket assembly 101 upon impact with other objects. In addition, insulating layer 120 with the water-repellant structured and arranged to repel water accumulation on the culinary tool; and water-repellant means for repelling water accumulation on the culinary tool. The food-grade silicone coating is further structured and arranged to repel water-accumulation on the culinary tool, can be water-resistant which assists preserving toast basket assembly 101 during washing or during water-contact. Moreover, insulating layer 120 exhibits its low chemical reactivity which assists preserving toast basket assembly 101 upon contact with chemicals.

Articulating side wall 132 includes a width of about four inches, as shown by dimension B in FIG. 4. Articulating side wall 132 includes a height of about five inches, as shown by dimension C in FIG. 4. Upon reading this specification, those with ordinary skill in the art will now appreciate that, under appropriate circumstances, considering such issues as design preference, manufacturing preferences, user preferences, cost, changing needs, future technologies, by way of example, other wall dimensions, such as, for example, different wall widths, different wall heights are also within the scope of the present disclosure.

L-shaped portion 152 of hinge bars 150 includes a width of about two-fifths of an inch, as shown by dimension G in FIG. 5B. Upon reading this specification, those with ordinary skill in the art will now appreciate that, under appropriate circumstances, considering such issues as design preference, manufacturing preferences, user preferences, cost, changing needs, future technologies, by way of example, other widths are also within the scope of the present disclosure.

Support frame 130 includes a width of about four and three-quarter inches, as shown by dimension D in FIG. 4. Support frame 130 includes a height of about four and nine-tenths of an inch as shown by dimension E in FIG. 4. Upon reading this specification, those with ordinary skill in the art will now appreciate that, under appropriate circumstances, considering such issues as design preference, manufacturing preferences, user preferences, cost, changing needs, future technologies, by way of example, other support frame dimensions, such as, for example, different support frame widths, different support frame heights are also within the scope of the present disclosure.

U-shaped bars 163 of holder portion 125 are spaced apart by about one-half inch, as shown by dimension F in FIG. 4. Upon reading this specification, those with ordinary skill in the art will now appreciate that, under appropriate circumstances, considering such issues as design preference, manufacturing preferences, user preferences, cost, changing needs, future technologies, by way of example, other separation lengths are also within the scope of the present disclosure.

As described herein, the assembly and method are configured for interacting with the internal slot mechanisms of the toaster so as to activate the desired heating and toasting operations of the toaster for the toasting of the entire inserted food product. The assembly is configured so as to minimalize the capturer or retention of any fallen portions of the food product on the assembly. The entire food product is captured within a collapsible cavity of the assembly that has a closed end for capturing the entire food product. After the heating process is complete, a single hand of the user removes the assembly with the toasted food product from the slot and can dispense the heated food product from the cavity of the assembly by a rotation of the hand of less than 90 degrees. The assembly is configured of a coated wire frame that minimizes the heat retention and subsequent transfer to the user that comes into contact with the assembly. The improved toaster system and method assists a user in the insertion and removal of a food product from a slotted toaster and assists in preventing thermal injury to the user while removing the assembly from the slotted toaster and removing the food product from the assembly.

The benefits of the various exemplary embodiments can include, but are not limited to, one or more of the following:

a) provide a system to assist a user to insert and retrieve a food product into and out of a slotted toaster;

b) assist preventing thermal injury to a user while inserting and retrieving a food product from a slotted toaster c) provide a holder for a food product which can be inserted and retrieved from a slotted toaster d) provide a food-grade silicone coating on the holder that resists heat transfer from the slotted toaster to the holder;

e) provide a food-grade silicone coating on the holder that resists heat transfer from the holder to the user's hands;

f) provide a food-grade silicone coating on the holder which assists resisting abrasive impact between the holder and the slotted toaster or other objects;

g) provide a holder for a food product that automatically releases the food product from the holder upon retrieval of the holder from the slotted toaster in order to minimize contact between the holder and the user's hands;

h) provide a holder that automatically releases the food product from the holder upon retrieval of the holder from the slotted toaster to so that the toasted food product can be poured onto a serving surface in order to minimize contact between the user's hands and the heated food product;

i) provide a holder for a food product that closes on the food product upon insertion into the slotted toaster;

j) provide a holder for a food product that automatically closes on the food product upon insertion into the slotted toaster in order to minimize contact between the user's hands and the holder;

k) provide a holder for a food product containing side walls that hingedly translate between an open and a closed position;

l) provide a holder for a food product containing side walls that are hingedly restricted to an acute angle in the open position in order to prevent the food product from falling out of the holder;

m) provide a system that is efficient, inexpensive, and handy. Other benefits of various embodiments may further be provided by this disclosure though not identified herein.

When describing elements or features and/or embodiments thereof, the articles "a", "an", "the", and "said" are intended to mean that there are one or more of the elements or features. The terms "including", "including", and "having" are intended to be inclusive and mean that there can be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense. Although this disclosure has described various exemplary embodiments, it should be understood that the broadest scope of this disclosure includes modifications such as diverse shapes, sizes, and materials. Such scope is limited only by the below claims as read in connection with the above specification. Further, many other advantages of applicant's disclosure will be apparent to those skilled in the art from the above descriptions and the below claims.

It is further to be understood that the processes or steps described herein are not to be construed as necessarily requiring their performance in the particular order discussed or illustrated. It is also to be understood that additional or alternative processes or steps can be employed.

What is claimed is:

1. A containing assembly for a food product for use as a culinary tool to assist in preventing thermal injury to a user while inserting and retrieving the food product into and out of a vertical toasting slot of a toaster, the assembly comprising:

a support assembly defining a basket cavity for receiving and retaining the food product, the support assembly having a support frame dimensioned for substantial insertion into the toasting slot of a toaster, the support frame including two u-shaped side bars, one defining a front side of the support frame and another defining a back side of the support frame, each u-shaped side bar having a first side end bar, a second side end bar, and a base bar connecting bottom ends of the two opposing first and second side end bars forming the u-shape of each u-shaped side bar, the two base bars of the two u-shaped side bars collectively defining a bottom of the support frame, the support frame defining between the front side and the back side as defined by the two spaced apart u-shaped side bars the basket cavity of the support frame for receiving the food product therein, the support assembly further having two opposing articulating side walls each having a upper end, a lower end and two side ends, wherein each lower end of each articulating side wall is coupled to the bottom of the support frame and each articulating side wall positioned between a different one of the two opposing u-shaped side bars and dimensioned for selectively enclosing one of the two opposing sides and capturing the received food product in the basket cavity of the support frame between the two articulating side walls, at least one of the articulating side walls outwardly rotatable about an axis defined at least in part by one of the base bars of one of the u-shaped side bars defining the bottom of the support frame, and a stop foot fixture positioned at the lower end of the at least one outwardly rotatable side walls and engaging one of the base bars of one of the u-shaped side bars of the support frame restricting the outward rotation of the at least one rotatable side wall at a predefined open position; and a handle fixedly coupled to the second side ends of the two u-shaped side bars of the support frame for grasping by a single hand of the user.

2. The containing assembly of claim 1 wherein the at least one side wall is rotatable outwardly and inwardly from a vertical position relative to the u-shaped side bars of the support frame.

3. The containing assembly of claim 2 wherein the stop foot fixture engages the base bar and does not restrict the inward rotation of the side wall into the basket cavity.

4. The containing assembly of claim 1 wherein each of the two side walls of the support assembly are rotatable about axes that are parallel and set apart from each other between the front side and the back side of the support frame and from and each being defined by one of the base bars of one of the u-shaped side bars defining to the bottom of the support frame.

5. The containing assembly of claim 4 wherein each one side wall is rotatable outwardly and inwardly from one of the sides of the basket cavity and from a vertical position relative to the spaced apart u-shaped side bars of the u-shaped support frame.

6. The containing assembly of claim 5 wherein each stop foot fixture of each side wall engages the base bar and does not restrict the inward rotation of the side wall.

7. The containing assembly of claim 1 wherein the two u-shaped side bars are spaced apart parallel to each other and being spaced apart by a dimension for receiving the food product therebetween and wherein the two first side end bar of each u-shaped side bar is coupled at the top with a loop and each u-shaped side bar has first side end bars of the two spaced apart u-shaped side bars being fixedly coupled together by one or more connecting bars to form a u-shaped support frame and the basket cavity therebetween.

8. The containing assembly of claim 7 wherein the support frame includes one or more cross pieces coupling the base bars of each of the two spaced apart parallel u-shaped side bars together at the bottom of the support frame, the cross pieces extending outwardly in a downward direction from the base bars of the two spaced apart parallel u-shaped side bars.

9. The containing assembly of claim 8 wherein the cross pieces have a convex shape in the downward direction away from the base bars.

10. The containing assembly of claim 8 wherein the cross pieces have at least one of a V-shape and a U-shape extending downward and outward from the base bars.

11. The containing assembly of claim 7 wherein the support frame includes a pivot restricting bar fixture attached to the cross pieces at a mid-point between the two base bars of the two parallel spaced apart u-shaped side bars, and wherein each side wall includes an extended foot fixture as the stop foot fixture for selectively engaging with the pivot restricting bar for restricting the outward rotation of the at least one rotating side wall.

12. The containing assembly of claim 11 wherein the pivot restricting bar and the extended foot fixture do not restrict the inward rotation of each rotating side wall.

13. The containing assembly of claim 7 wherein each of the spaced apart parallel u shaped side bars includes an elongated extension of the two first side end bars forming the handle.

14. The containing assembly of claim 13 wherein a handle fixture is attached to each of the elongated extensions for forming the handle.

15. The containing assembly of claim 1 wherein the at least one outwardly rotatable side wall is rotatable about the base bar forming the axis.

16. The containing assembly of claim 15 wherein the at least one rotatable side wall includes a plurality of hinge bars forming the side wall and a support bar coupling each of the hinge bars having a lower end adjacent to one of the base bars of one of the u-shaped side bars defining the bottom of the support frame, the support bar engaging the base bar and rotating about a surface of the base bar during outward rotation of the rotatable side wall.

17. The containing assembly of claim 16 wherein the support frame includes a pivot restricting bar parallel to and in contact with at least one of the base bars and wherein one or more of the hinge bars includes an L-shaped extension forming the stop foot fixture on an lower end of the hinge bar, the L-shaped extension extending below the support bar and selectively engaging the pivot restricting bar restricting the outward rotation of the rotating side wall.

18. The containing assembly of claim 1 wherein the two u-shaped side bars of the support frame is a wire frame configured from a core wire.

19. The containing assembly of claim 18 wherein the wire frame is coated with an insulating layer composed of a heat-resistant non-conductive material.

20. The containing assembly of claim 19 wherein the insulating layer composed of heat-resistant non-conductive material includes a heat-resistant plastic.

21. The containing assembly of claim 18 wherein the wire frame is coated with a silicone.

22. The containing assembly of claim 18, further comprising an impact-attenuator consisting of a covering layer on the support assembly of impact resisting material resisting impact between the culinary tool and external objects.

23. The containing assembly of claim 1, further comprising a water-repelling coating layer on the support assembly repelling water accumulation on the culinary tool.

24. The containing assembly of claim 1 wherein the articulating side walls and the support frame include a pivot-restrictor fixture including the stop foot fixture restricting the rotation of the side walls to an acute angle that is between about five degrees and about forty-five degrees.

25. The containing assembly of claim 1 wherein the articulating side walls and the support frame include a pivot-restrictor fixture including the stop foot fixture restricting the rotation of the side walls to an acute angle that is between about seven degrees and seventeen degrees.

26. A containing assembly for a food product for use as a culinary tool to assist in preventing thermal injury to a user while inserting and retrieving the food product into and out of a toasting slot of a toaster, the assembly comprising:

a support assembly defining a basket cavity for receiving and retaining the food product, the support assembly having a support wire frame including two spaced apart u-shaped side bars each u-shaped bar having two side end bars, a first side end bar and a second side end bar, and a base bar therebetween defining the u-shape of each u-shaped side bar of the support wire frame, the base bars of each u-shaped side bar defining a bottom of the support frame, the support assembly also including two articulating side walls coupled to the bottom of the support frame, at least one of the side walls rotatable about an axis defined at least in part by one of the base bars of one of the u-shaped side bars defining the bottom of the support frame, and a stop foot fixture of the articulating side wall configured for restricting the outward rotation of the rotatable side wall at a predefined open position, wherein the support frame includes a loop connecting top ends of the two first side end bars of the two spaced apart u-shaped side bars, one or more connecting bars connecting the side end bars of the two spaced apart u-shaped side bars, and one or more cross pieces coupling the two base bars of each of the two u-shaped side bars together at the bottom of the support frame, the cross pieces extending outwardly in a downward direction from the base bars; and a handle fixedly coupled to the second side end bars of the two u-shaped side bars of the support frame for grasping by a single hand of the user.

27. The containing assembly of claim 26 wherein the cross pieces have a convex shape in the downward direction away from the base bars.

28. The containing assembly of claim 26 wherein the cross pieces have at least one of a V-shape and a U-shape extending downward and outward from the base bars.

29. A containing assembly for a food product for use as a culinary tool to assist in preventing thermal injury to a user while inserting and retrieving the food product into and out of a toasting slot of a toaster, the assembly comprising:

a support assembly defining a basket cavity for receiving and retaining the food product, the support assembly having a support frame including a u-shaped frame defined by two spaced apart u-shaped side bars, each u-shaped side bar having two opposing first and second side end bars and a base bar between the two side end bars defining the u-shape of each u-shaped side bar, two articulating side walls coupled to the bottom of the support frame, at least one of the side walls rotatable about an axis defined at least in part by one of the base bars of one of the u-shaped side bars defining the bottom of the support frame, and a stop foot fixture of the articulating side wall configured for restricting the outward rotation of the rotatable side wall at a predefined open position, wherein the support frame includes one or more connecting bars connecting the side end bars of the two spaced apart u-shaped side bars, and includes a pivot restricting bar attached to the cross pieces at a mid-point between the two parallel bars, and wherein each side wall includes a foot portion configured as a stop foot fixture for selectively engaging with the pivot restricting bar for restricting the outward rotation of the at least one rotating side wall; and a handle fixedly coupled to at least one of the two side end bars of the of the two spaced apart u-shaped side bars of the support frame for grasping by a single hand of the user.

30. The containing assembly of claim 29 wherein the pivot restricting bar and foot portion are configured to not restrict the inward rotation of each rotating side wall.

31. A containing assembly for a food product for use as a culinary tool to assist in preventing thermal injury to a user while inserting and retrieving the food product into and out of a toasting slot of a toaster, the assembly comprising:

a support assembly defining a basket cavity for receiving and retaining the food product, the support assembly having a support frame including two u-shaped side bars each having two side end bars, a first side end bar and a second side end bar, a base bar, two articulating side walls coupled to the bottom of the support frame, at least one of the side walls rotatable about an axis defined at least in part by one of the base bars of one of the u-shaped side bars defining the bottom of the support frame, and a stop foot fixture of one of the side walls configured for restricting the outward rotation of the rotatable side wall at a predefined open position, wherein the support frame includes one or more connecting bars connected the first and second side end bars of the two spaced apart u-shaped side bars together and defining the spaced apart distance therebetween, and a handle bar extending from the second side end bars for forming the handle support; and a handle fixedly coupled to the handle support defined by the second side bars of the support frame for grasping by a single hand of the user.

32. A containing assembly for a food product for use as a culinary tool to assist in preventing thermal injury to a user while inserting and retrieving the food product into and out of a toasting slot of a toaster, the assembly comprising:

a support assembly defining a basket cavity for receiving and retaining the food product, the support assembly having a support frame including two u-shaped side bars each having two side end bars, a first side end bar and a second side end bar and a base bar defining a bottom of the support frame by coupling the first side end bar to the second side end bar to form the u-shape of the u-shaped side bars, and two articulating side walls coupled to the bottom of the support frame, at least one of the side walls rotatable about an axis defined at least in part by one of the base bars of one of the u-shaped side bars defining the bottom of the support frame, and a stop foot fixture of one of the side walls configured for restricting the outward rotation of the rotatable side wall at a predefined open position, wherein the at least one rotatable side wall is rotatable about one of the base bars and the at least one rotatable side wall includes a plurality of hinge bars forming the side wall and a support bar coupling each of the hinge bars and being at a lower end of the support bar and adjacent to one of the base bars of one of the u-shaped side bars defining the bottom of the support frame, the support bar being configure to engage the base bar and rotate about a surface of the base bar during rotation of the rotatable side wall, and the support frame includes a pivot restricting bar parallel to and in contact with at least one of the base bars and wherein one or more of the hinge bars includes an L-shaped downward extension below the support bar configured to selectively engage the pivot restricting bar for restricting the outward rotation of the rotating side wall; and a handle fixedly coupled to one of the two side end bars of one of the two u-shaped side bars of the support frame for grasping by a single hand of the user.

* * * * *